(12) United States Patent
Lashley et al.

(10) Patent No.: US 9,189,518 B2
(45) Date of Patent: Nov. 17, 2015

(54) GATHERING INDEX STATISTICS USING SAMPLING

(71) Applicant: International Business Machines Corporation, Armonk, NY (US)

(72) Inventors: Scott D. Lashley, Portland, OR (US); Bingjie Miao, Englewood, CO (US)

(73) Assignee: International Business Machines Corporation, Armonk, NY (US)

( * ) Notice: Subject to any disclaimer, the term of this patent is extended or adjusted under 35 U.S.C. 154(b) by 464 days.

(21) Appl. No.: 13/656,355

(22) Filed: Oct. 19, 2012

(65) Prior Publication Data

US 2014/0115009 A1    Apr. 24, 2014

(51) Int. Cl.
*G06F 17/30* (2006.01)

(52) U.S. Cl.
CPC .......... *G06F 17/30442* (2013.01); *G06F 17/30* (2013.01)

(58) Field of Classification Search
None
See application file for complete search history.

(56) References Cited

U.S. PATENT DOCUMENTS

| | | | | |
|---|---|---|---|---|
| 5,123,104 | A * | 6/1992 | Levine et al. | 1/1 |
| 6,493,762 | B1 * | 12/2002 | Chen et al. | 709/231 |
| 6,513,028 | B1 * | 1/2003 | Lee et al. | 1/1 |
| 6,519,604 | B1 * | 2/2003 | Acharya et al. | 707/738 |
| 7,567,949 | B2 * | 7/2009 | Chaudhuri et al. | 1/1 |
| 7,644,069 | B2 * | 1/2010 | Chen et al. | 707/723 |
| 7,895,189 | B2 * | 2/2011 | Balmin et al. | 707/715 |
| 8,229,917 | B1 | 7/2012 | Aneas et al. | 707/713 |
| 8,352,483 | B1 * | 1/2013 | Ramesh et al. | 707/758 |
| 2002/0152305 | A1 | 10/2002 | Jackson et al. | 709/224 |
| 2003/0056082 | A1 | 3/2003 | Maxfield | 712/4 |
| 2004/0199530 | A1 | 10/2004 | Avadhanam et al. | 707/100 |
| 2004/0225639 | A1 * | 11/2004 | Jakobsson et al. | 707/2 |
| 2006/0036564 | A1 * | 2/2006 | Yan et al. | 707/1 |
| 2007/0083483 | A1 * | 4/2007 | Lawande | 707/1 |
| 2008/0052269 | A1 * | 2/2008 | Abdo et al. | 707/2 |
| 2008/0133454 | A1 * | 6/2008 | Markl et al. | 707/2 |
| 2009/0271421 | A1 * | 10/2009 | Gemulla et al. | 707/101 |
| 2010/0306273 | A1 * | 12/2010 | Branigan et al. | 707/802 |
| 2012/0166478 | A1 * | 6/2012 | Das et al. | 707/769 |
| 2014/0136510 | A1 * | 5/2014 | Parkkinen et al. | 707/711 |
| 2014/0207754 | A1 * | 7/2014 | Lashley et al. | 707/715 |

OTHER PUBLICATIONS

Olken, Random Sampling from Databases, 1993, retrieved on Feb. 21, 2015, retrieved from the Internet <URL: http://citeseerx.ist.psu.edu/viewdoc/download;jsessionid=8DC8A3301A3B8F6DBCD3C2FC64E80060?doi=10.1.1.144.4987&rep=rep1&type=pdf>.*

* cited by examiner

*Primary Examiner* — Neveen Abel Jalil
*Assistant Examiner* — Tyler Togrimson
(74) *Attorney, Agent, or Firm* — VanLeeuwen & VanLeeuwen; Mohammed Y. Kashef

(57) ABSTRACT

An approach is provided in which a sample point system allocates sample point identifiers to a root node included an index tree that includes multiple leaf nodes. The sample point system distributes the sample point identifiers to the root node's child nodes, and recursively traverses through the index tree's hierarchical index levels and distributes the sample point identifiers from the child nodes to a subset of the index tree's leaf nodes. In turn, the sample point system collects sample data from the subset of the plurality of leaf nodes corresponding to the distributed sample point identifiers.

14 Claims, 8 Drawing Sheets

GATHERING INDEX STATISTICS USING SAMPLING

BACKGROUND

The present disclosure relates to uniformly collecting leaf node sample data throughout an index tree of a database.

Database query optimizers typically require statistics in order to produce optimal query plans. Index statistics may include a number of keys, a number of unique keys, a number of hierarchical levels in an index tree, etc. These statistics are normally gathered by traversing the entire index tree and is a resource-intensive operation and requires substantial I/O bandwidth, especially for large index trees. Users often avoid gathering statistics in a timely manner because of the impact to the system performance while calculating the statistics, thus leading to sub-optimal query plans.

BRIEF SUMMARY

According to one embodiment of the present disclosure, an approach is provided in which a sample point system allocates sample point identifiers to a root node included an index tree that includes multiple leaf nodes. The sample point system distributes the sample point identifiers to the root node's child nodes, and recursively traverses through the index tree's hierarchical index levels and distributes the sample point identifiers from the child nodes to a subset of the index tree's leaf nodes. In turn, the sample point system collects sample data from the subset of the plurality of leaf nodes corresponding to the distributed sample point identifiers.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present disclosure, will become apparent in the non-limiting detailed description set forth below.

BRIEF DESCRIPTION OF THE SEVERAL VIEWS OF THE DRAWINGS

The present disclosure may be better understood, and its numerous objects, features, and advantages made apparent to those skilled in the art by referencing the accompanying drawings, wherein.

DETAILED DESCRIPTION

Figure 1:
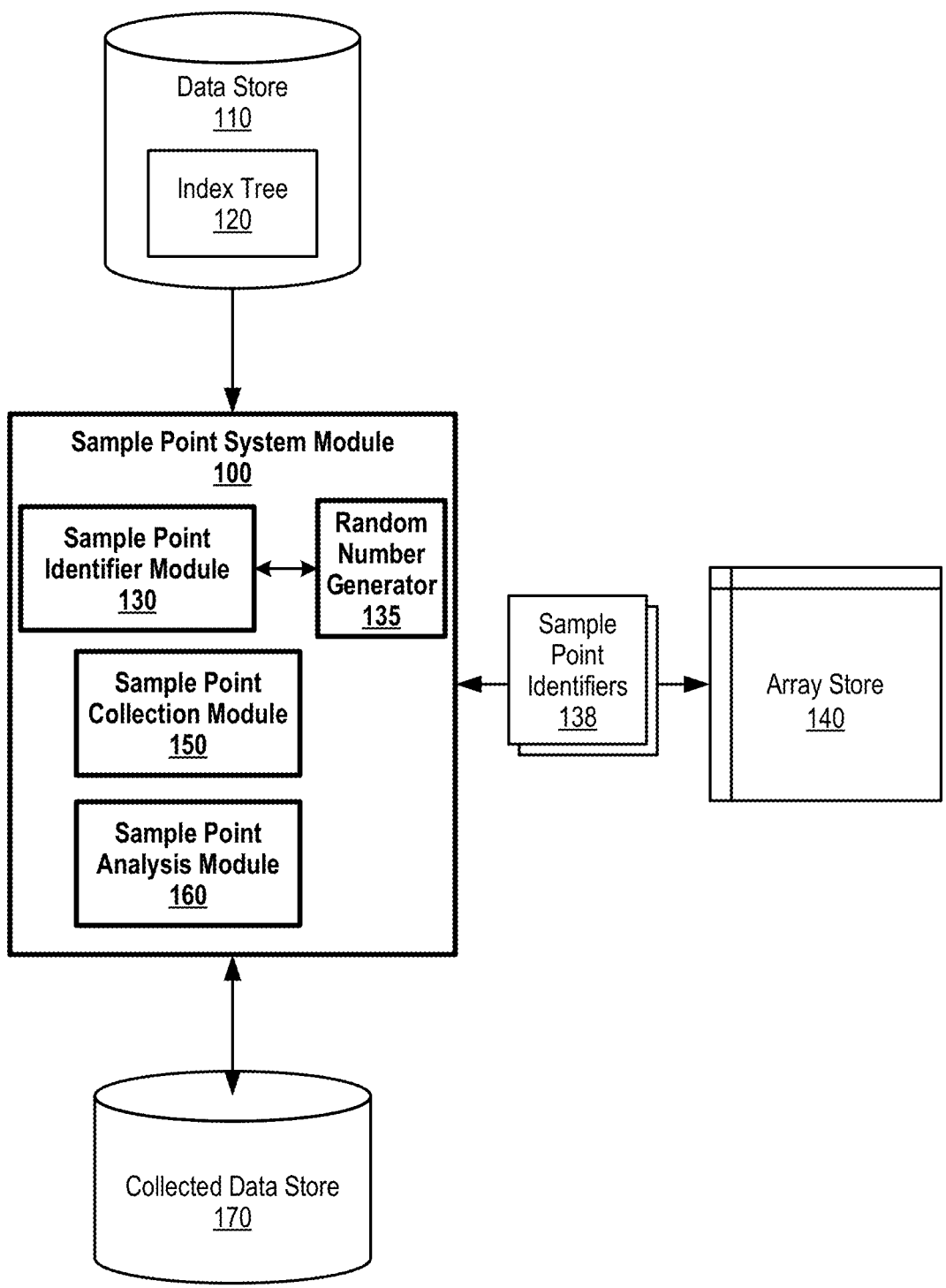
FIG. 1 is a diagram showing a system that uniformly distributes sample point identifiers across selected leaf nodes in an index tree and collects sample data from the selected leaf nodes.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The following detailed description will generally follow the summary of the disclosure, as set forth above, further explaining and expanding the definitions of the various aspects and embodiments of the disclosure as necessary.

FIG. 1 is a diagram showing a system that uniformly distributes sample point identifiers across selected leaf nodes in an index tree and collects sample data from the selected leaf nodes. An index tree (e.g., B-tree index) of a database typically includes nodes arranged in hierarchical levels. The "top" level includes a root node and the "bottom" level includes leaf nodes. Nodes between the root node and the leaf nodes typically have multiple child pointers that point to different child nodes at a next lower hierarchical level (see FIG. 2 and corresponding text for further details).

Sample point system module 100 includes sample point identifier module 130, sample point collection module 150, and sample point analysis module 160. Sample point identifier module 130 retrieves index tree 120 from data store 110 and computes a number of required samples in order to achieve an accurate sampling of index tree 120. In one embodiment, sample point identifier module 130 determines a number of required samples based on approximate size of the index tree (e.g. number of pages the index occupies). In another embodiment, sample point identifier module 130 uses a fixed number of sample point identifiers for each index, and relies on subsequent statistical analysis to determine a total number of samples to use.

Figure 2:
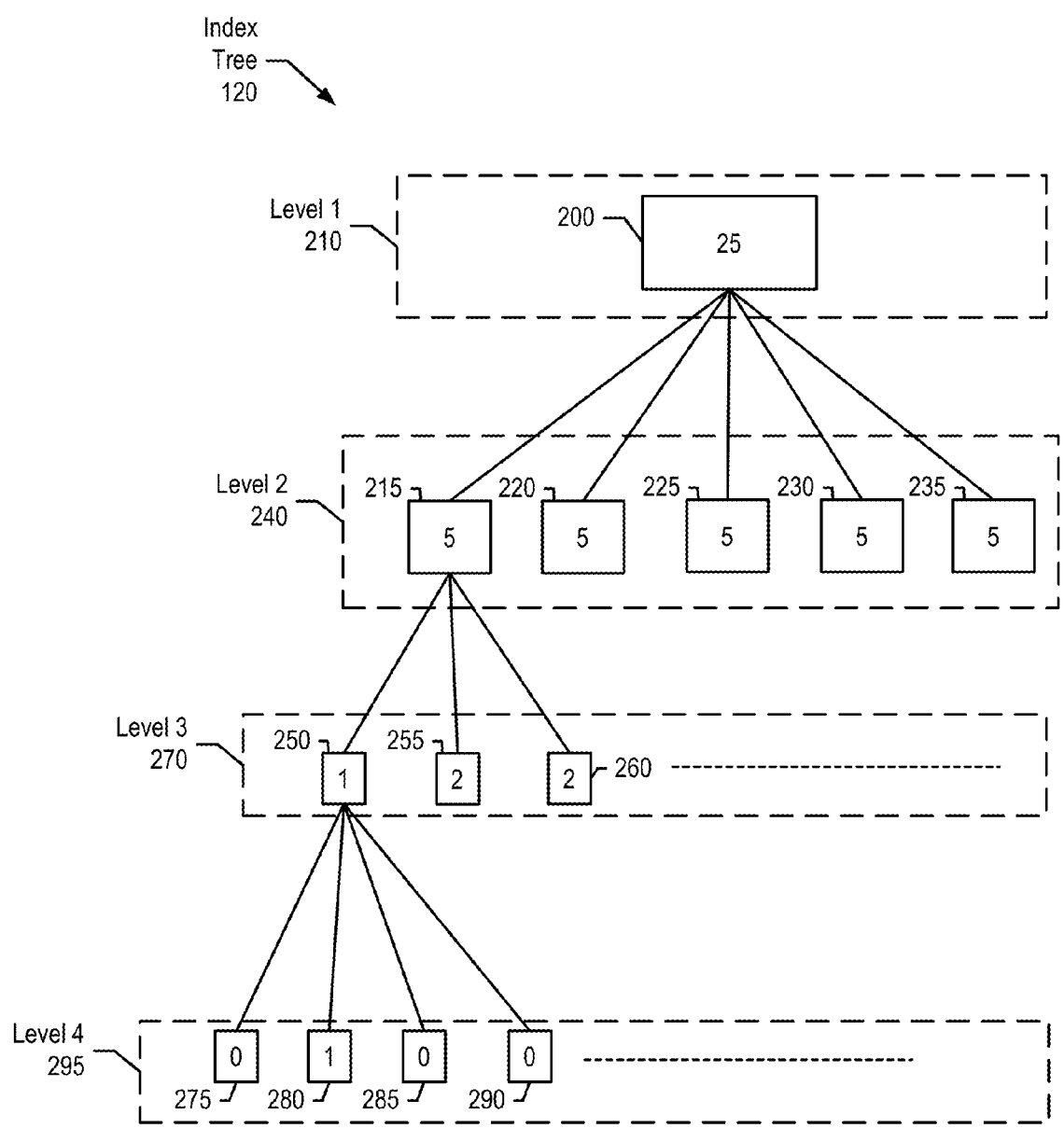
FIG. 2 is an exemplary diagram showing a system traversing an index tree and uniformly distributing sample point identifiers from the root node to various index nodes.

Sample point identifier module 130 allocates a number "sample point identifiers" (based upon the computed amount of required samples discussed above) to index tree 120's root node and identifies the root node's child nodes. Referring to FIG. 2, sample point identifier module 100 identifies nodes 215-235 as child nodes of root node 200. As such, sample point identifier module 130 computes a distribution average based upon the number of sample point identifiers and child nodes (e.g., 25 sample point identifiers divided by five child nodes=5) in order to ensure uniform distribution across the child nodes.

Sample point identifier module 130 seeds random number generator 135 and loads it with boundary information pertaining to the number of child nodes (e.g., five). As such, sample point identifier module 130 invokes random number generator 135 to generate random numbers within a range corresponding to the number of child nodes. In turn, sample point identifier module 130 begins re-distributing the sample point identifiers to the child nodes corresponding to the randomly generated numbers.

For example, sample point identifier module 130 may use memory arrays (stored in array store 140) to track sample point identifier distribution. In this example, when random number generator 135 generates a "2", sample point identifier module 130 increments the second slot in the memory array, thus allocating one of sample point identifiers 138 to the second child node. When random number generator 135 generates a number corresponding to a slot that already has an amount of sample point identifiers equal to the distribution average, sample point identifier module 130 invokes random number generator 135 to produce a different random number. As a result, different regions of index tree 120 are fairly represented in a final sample collection (see FIG. 5 and corresponding text for further details).

Sample point identifier module 130 continues to re-distribute sample point identifiers 138 in memory arrays located in array store 140 to lower level memory arrays corresponding to lower hierarchical levels based upon generated random numbers until they reach the level above the leaf node level (see FIG. 2 and corresponding text for further details). Since the child nodes of this level are the leaf nodes, the populated array at this level represents the leaf nodes that will be included in the sample. Once the sample point identifiers 138 are assigned to nodes at the level above the leaf nodes, sample point collection module 150 collects sample data from the corresponding leaf nodes.

In one embodiment, the identification and collection are performed concurrently on a per leaf node basis. In another embodiment, the identification is performed to identify each of the leaf nodes and the collection is subsequently performed on each of the leaf nodes (see FIGS. 4, 5, 6, and corresponding text for further details). Sample point collection module 150 stores the collected sample data in collected data store 170.

In one embodiment, in order to determine how much sampling should be performed, sample point system module 100 performs "iterations" of sampling, with each iteration including enough samples to cover the entire index. In this embodiment, sample point analysis module 160 computes a "collected sample standard deviation" of the collected sample data and compares it against a standard deviation threshold. When the collected sample standard deviation does not reach the standard deviation threshold, sample point identifier module 130 repeats steps discussed above to distribute sample point identifiers to leaf nodes based upon different sets of random numbers, and sample point collection module 150 collects sample data from the newly identified leaf nodes.

In another embodiment, in order to avoid too many samples to be gathered for an index, a maximum iteration amount is calculated for an index tree based on the size of the index tree. When the maximum number of iterations is performed and the standard deviation is still not under the threshold, a warning message may be generated to warn users that gathered statistics with sampling may be inaccurate due to data skew.

FIG. 2 is an exemplary diagram showing a system traversing an index tree and uniformly distributing sample point identifiers from the root node to various leaf nodes. Index tree 120 is arranged in multiple hierarchical levels, which are level 1 210, level 2 240, level 3 270, and level 4 295. As those skilled in the art can appreciate, index tree 120 may have more or less hierarchical levels than what is shown in FIG. 2.

Level 1 210 includes root node 200. Sample point identifier module 130 computes a number of sample point identifiers and allocates the sample point identifiers to root node 200. The example in FIG. 2 shows that 25 samples are allocated to root node 200. Root node 200 has five child nodes in level 2 240, which are nodes 215, 220, 225, 230, and 235.

The example in FIG. 2 shows that since root node 200 has five child nodes, the distribution average is five. As such, nodes 215-235 should have a maximum of five sample point identifiers. Once a child node gets its share of the samples, the child node recursively distributes its samples among its child nodes by the same process. FIG. 2 shows that node 215 has three child nodes, which are nodes 250, 255, and 260. As such, sample point identifier module 130 computes a distribution average (5/3=1.67, rounded up to 2) and generates random numbers to randomly populate the memory array corresponding to level 3 270.

Since level 3 270 does not include leaf nodes, sample point identifier module 130 selects node 250 and identifies its child nodes 275, 280, 285, and 290. Sample point identifier module 130 computes a distribution average and generates a new random number to distribute the one sample point identifier allocated to node 250 to one of its child nodes (node 280). As can be seen, the generated random number corresponds to the second leaf node 280.

Since level 4 295 includes leaf nodes, sample point identifier module 130 selects the next node in level 3 270 (node 255) to distribute its sample point identifiers to its leaf nodes. Sample point identifier module proceeds to traverse and distribute sample point identifiers for node 215's child nodes, and then selects the next node in level 2 240 (node 220) to distribute its sample point identifiers in similar fashion.

In one embodiment, once each of the 25 sample point identifiers are logically distributed throughout index tree 120's leaf nodes, collecting the sample data from the leaf nodes may be an "ordered" traversal of the sampled index nodes. In this embodiment, the first sample follows the first "sampled" child at level 2 240's nodes, to reach a level 3 270 node, then follow its first "sampled" child to a level 4 295 node, and so on until it reaches the leaf level. The next sample starts from the root node again, and follows the next "sampled" child (which is still node 215 since it represents five samples), to a level 3 270 node, which follows its next "sampled" child, etc.

In one embodiment, identifying leaf nodes and collecting sample data using steps discussed herein provide several advantages. First, samples are collected uniformly across an entire index tree, such that different regions of the index tree have a fair representation. Second, the ordered traversal of index nodes during sampling ensures that multiple accesses to each index node are "clustered" during the sampling process, and thus random I/O is minimized during sampling. Third, the ordered traversal of index nodes allows simple duplicate index key detection across index nodes. When an index key is highly duplicated and covers many index nodes at a certain index level, the ordered traversal of index nodes at the particular level may detect such duplication. Fourth, uniform representation of the entire index ensures uncomplicated statistical analysis and reduces variation among different samples.

In another embodiment, the sampling approaches discussed herein are applicable to an index tree regardless of the number of samples required for which to collect. In this embodiment, when gathering a number of leaf nodes, a number of unique keys, a number of total index keys, or a large number of samples may be preferred with each sample covering a small index region (e.g., a single index leaf page). On the other hand, when gathering clustering information, each sample may cover a larger consecutive region of the index since data page access patterns across a large number of consecutive RIDs (row identifiers) are required and, as such, a relatively smaller number of samples may be required.

Figure 3:
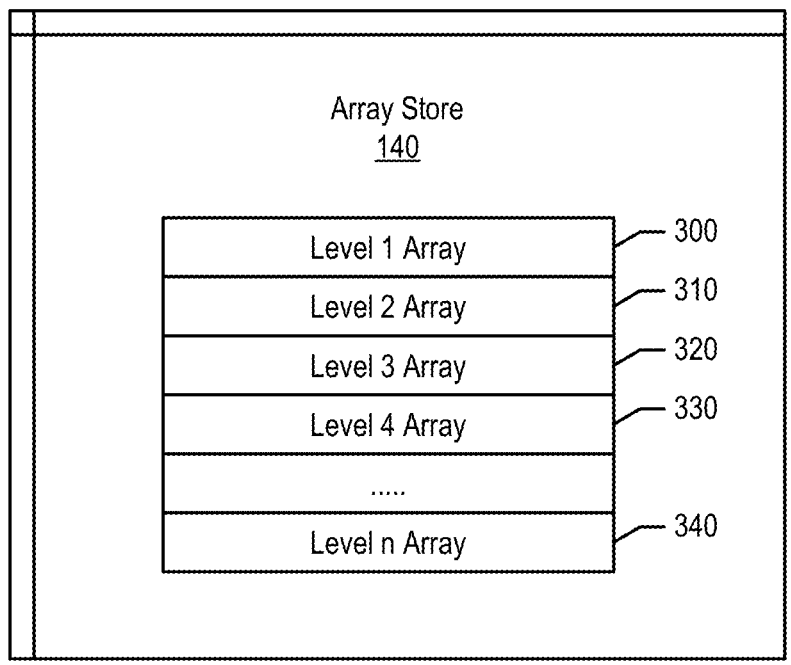
FIG. 3 is a diagram showing multiple storage arrays that store sample point identifier information on a per-level basis.

FIG. 3 is a diagram showing multiple storage arrays that store sample point identifier information on a per-level basis. In one embodiment, array store 140 includes memory arrays 300-340, which each correspond to a particular hierarchical level in an index tree (e.g., levels 210, 240, and 270 shown in FIG. 2). The leaf level of an index tree (e.g., level 295 shown in FIG. 2) does not have a corresponding array store since nodes at the leaf level do not have child nodes. In this embodiment, sample point system module 100 re-uses memory arrays 300-340 during the recursive traversal steps and, therefore, reduces memory requirements. For example, sample point system module 100 may utilize memory array 300 to store root level information (e.g., "25" for node 200 shown in FIG. 2). In this example, sample point system module 100 may utilize memory array 310 to represent and distribute the sample point identifiers across the root node's child nodes (e.g., nodes 215-235 shown in FIG. 2). As such, sample point system module 100 selects node 215 and utilizes memory array 320 to re-distribute the sample point identifier allocated to node 215. After sample point system module 100 finishes recursively traversing node 215 sub-tree, sample point system module 100 may re-use memory arrays 310-340 when re-distributing node 220's sample point identifiers to its subnodes.

Figure 4:
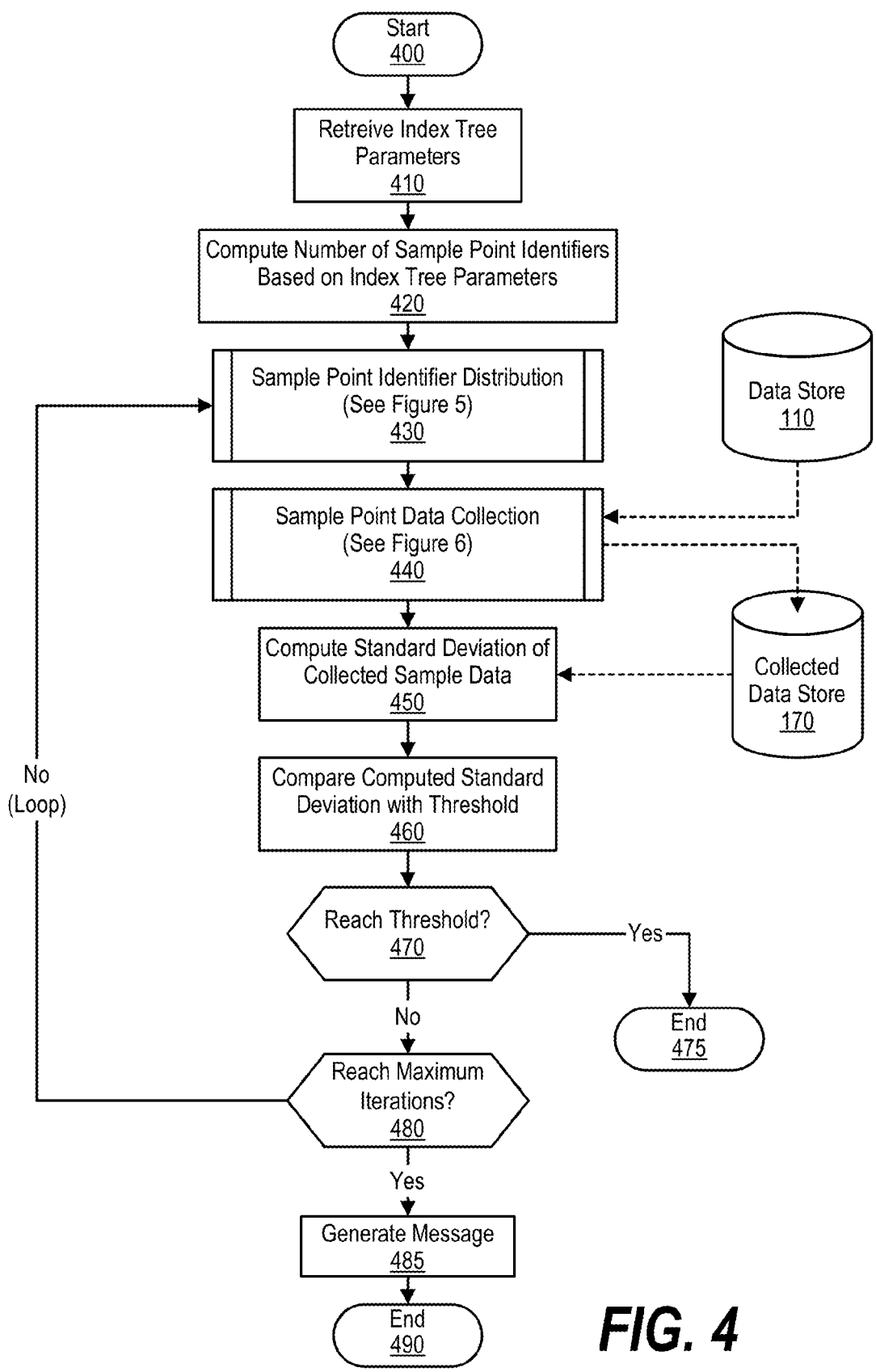
FIG. 4 is a high level flowchart showing steps taken in distributing sample point identifiers across an index tree and collecting sample data from leaf nodes corresponding to the distributed sample point identifiers.

FIG. 4 is a high-level flowchart showing steps taken in distributing sample point identifiers across an index tree and collecting sample data from leaf nodes corresponding to the distributed sample point identifiers. Processing commences at 400, whereupon processing retrieves index tree parameters at step 410, such as the number of pages an index tree occupies.

At step 420, processing computes a number of sample points required to collect from the index tree based upon the index tree parameters. Next, processing traverses through the index tree and uniformly distributes the sample point identifiers to leaf nodes according to randomly generated numbers (identifies leaf nodes for which to collect sample data, predefined process block 430, see FIG. 5 and corresponding text for further details). Processing then collects sample data from the index tree stored on data store 110 from the leaf nodes corresponding to the sample point identifiers, and stores the collected data in collected data store 170 (pre-defined process block 440, see FIG. 6 and corresponding text for further details). In one embodiment, processing concurrently identifies leaf nodes (step 430) and collects sample data from the identified leaf node (step 440).

At step 450, processing computes a standard deviation of the collected sample data stored in collected data store 170. For example, each "sample iteration" may include three separate passes through the index tree, and standard deviation can be computed from index statistics gathered during the three passes. Processing compares the computed standard deviation with a standard deviation threshold to determine whether the sample data accurately represents the index tree (step 460). A determination is made as to whether the computed standard deviation reaches the threshold (decision 470). If the computed standard deviation reaches the threshold, indicating a uniform distribution, decision 470 branches to the "Yes" branch, whereupon processing ends at 475. In one embodiment, a future query may utilize the collected sample data to generate a query plan for the corresponding database.

On the other hand, if the computed standard deviation does not reach the threshold, decision 470 branches to the "No" branch, whereupon a determination is made as to whether processing has reached a maximum number of iterations to traverse through the index tree and collect data (decision 480). If not, processing branches to the "No" branch, whereupon processing continues with a new "sample iteration", which generates new random numbers and distributes the sample point identifiers to various leaf nodes according to the new random numbers and collects data accordingly. This looping continues until processing reaches the maximum number, at which point decision 480 branches to the "Yes" branch, whereupon processing generates a message at step 485 that indicates the collected sample data does not meet the standard deviation threshold. Processing ends at 490.

Figure 5:
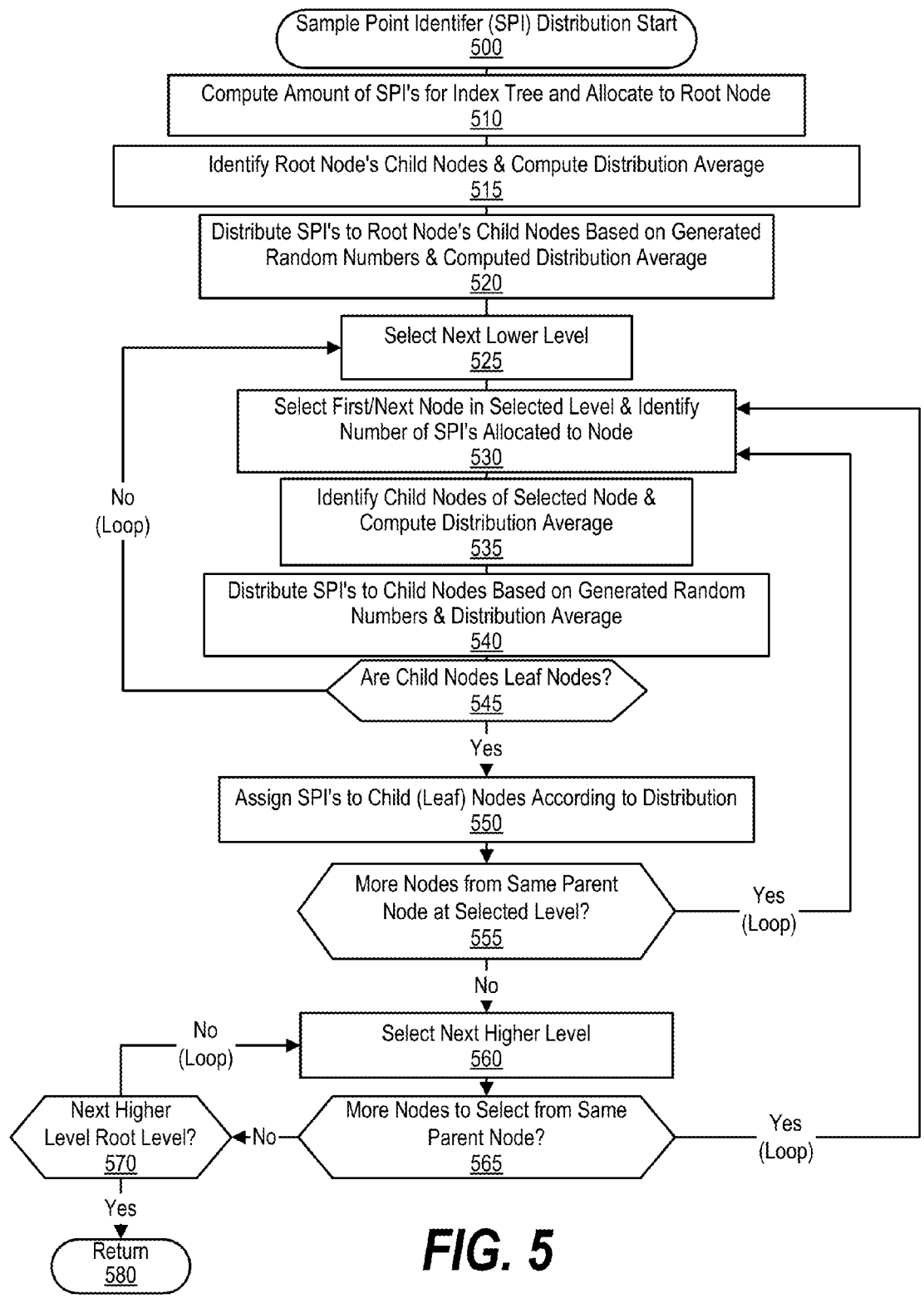
FIG. 5 is a flowchart showing steps taken in distributing sample point identifiers to leaf nodes included in an index tree.

FIG. 5 is a flowchart showing steps taken in distributing sample point identifiers to leaf nodes included in an index tree. Processing commences at 500, whereupon processing computes an amount of sample point identifiers to allocate to an index tree and assigns the sample point identifiers to the index tree's root node at step 510 (e.g., node 200 shown in FIG. 2).

Next, at step 515, processing identifies the number of child nodes coupled to the root node and computes a distribution average. For example, assuming the root node is allocated 20 sample points and has four child nodes, the distribution average is 20/4=5. Processing uses the distribution average to ensure a particular child node does not receive more than an average amount of sample point identifiers (discussed below).

At step 520, processing distributes the sample point identifiers to the child nodes based on randomly generated numbers and the distribution average. In one embodiment, processing generates a random number and allocates a sample point identifier to the corresponding child node unless the corresponding child node already has an allocated amount of sample point identifiers equal to the distribution average. When the corresponding child node has an allocated amount of sample point identifiers equal to the distribution average, processing generates a new random number to select a child node that does not have the allocated number of sample point identifiers.

Processing selects the next "lower level" of nodes at step 525. Referring to FIG. 2, processing selects level 2 240. At step 530, processing selects the first node in the selected level (e.g., node 215 in FIG. 2) and identifies the number of sample point identifiers allocated to the first node. The example in FIG. 2 shows that node 215 is allocated five sample point identifiers.

Processing, at step 535, identifies child nodes of the selected node (e.g., nodes 250-260 in FIG. 2) and computes a distribution average based upon the number of child nodes. Referring to FIG. 2, since node 215 has five sample point identifiers and three child nodes, the average sample distribution number is 1.67 (rounded up to 2). In turn, processing distributes the sample point identifiers to the child nodes based upon a different random number and the computed distribution average (step 540).

A determination is made as to whether the child nodes are leaf nodes (decision 545). Referring to FIG. 2, nodes 250-260 are not leaf nodes. If the child nodes are not leaf nodes, decision 545 branches to the "No" branch, which loops back to select the next lower level of nodes (level 3 270 in FIG. 2). Processing then selects the first node (node 250) in the selected level (step 530), identifies corresponding child nodes (nodes 275-290) and computes a distribution average at step 535.

In turn, processing distributes the sample point identifiers to node 250's child nodes 275-290 at step 540 based upon the distribution average and a generated random number. Since nodes 275-290 are leaf nodes, decision 545 branches to the "Yes" branch, whereupon processing assigns the distributed sample point identifiers to the child nodes at step 550. Referring to FIG. 2, processing assigns one sample point identifier to node 280.

A determination is made as to whether there are more nodes from the same parent node at the selected level (decision 555). Referring to FIG. 2, since the currently selected level is level 3 270, processing identifies nodes 255 and 260 are nodes yet to be processed from parent node 215. If there are more nodes to process from the same parent node, decision 555 branches to the "Yes" branch, which loops back to select and traverse the next node. This looping continues until there are no more nodes from the same parent node at the selected level (after processing each of node 215's child nodes), at which point decision 555 branches to the "No" branch.

At step 560, processing selects the next higher level (level 2 240), and a determination is made as to whether there are more nodes to process from the same parent (decision 565). Referring to FIG. 2, since the currently selected level is level 2 240, processing identifies nodes 220, 225, 230, and 235 are nodes yet to be processed from parent node 200 (root node). If there are more nodes to process from the same parent node, decision 565 branches to the "Yes" branch, which loops back to select and traverse the next node (e.g., node 220). This looping continues until there are no more nodes from the same parent node at the selected level (after processing each of node 200's child nodes), at which point decision 565 branches to the "No" branch.

A determination is made as to whether the next higher level is the root level (decision 570). If the next higher level is not the root level, decision 570 branches to the "No" branch, whereupon processing selects the next higher level and proceeds to traverse other branches of the index tree. This looping continues until processing determines that the next higher level is the root level, at which point decision 570 branches to the "Yes" branch and returns at 580.

Figure 6:
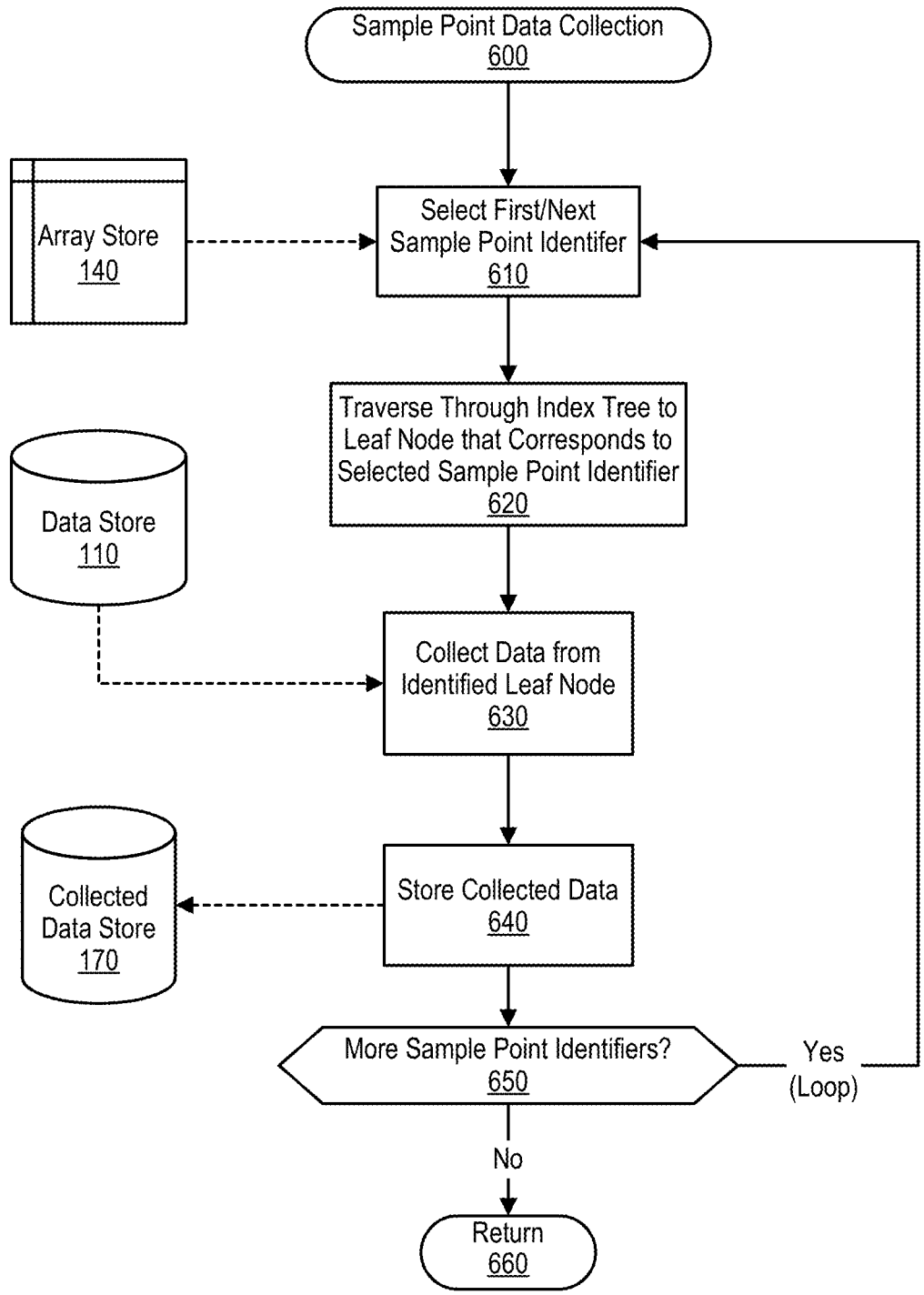
FIG. 6 is a flowchart showing steps taken in collecting sample data from leaf nodes with an assigned sample point identifier.

FIG. 6 is a flowchart showing steps taken in collecting sample data from leaf nodes with an assigned sample point identifier. In one embodiment, sample point data collection steps may occur concurrently with sample point identifier distribution steps (FIG. 5).

Processing commences at 600, whereupon processing selects the first sample point identifier from array store 140 at step 610. At step 620, processing traverses through the index tree to the leaf node corresponding to the selected sample point identifier. In one embodiment, processing generates a table that stores the index tree location of the leaf nodes that are assigned sample point identifiers.

Next, processing collects data from the identified leaf node (stored in data store 110) at step 630, and stores the collected data in collected data store 170 at step 640 for further analysis (see FIG. 4 and corresponding text for further details).

A determination is made as to whether there are more sample point identifiers for which to collect corresponding leaf node data (decision 650). If there are more sample point identifiers to process, decision 650 branches to the "Yes" branch, which loops back to select and process the next sample point identifier. This looping continues until there are no more sample point identifiers to process, at which point decision 650 branches to the "No" branch and returns at 660.

Figure 7:
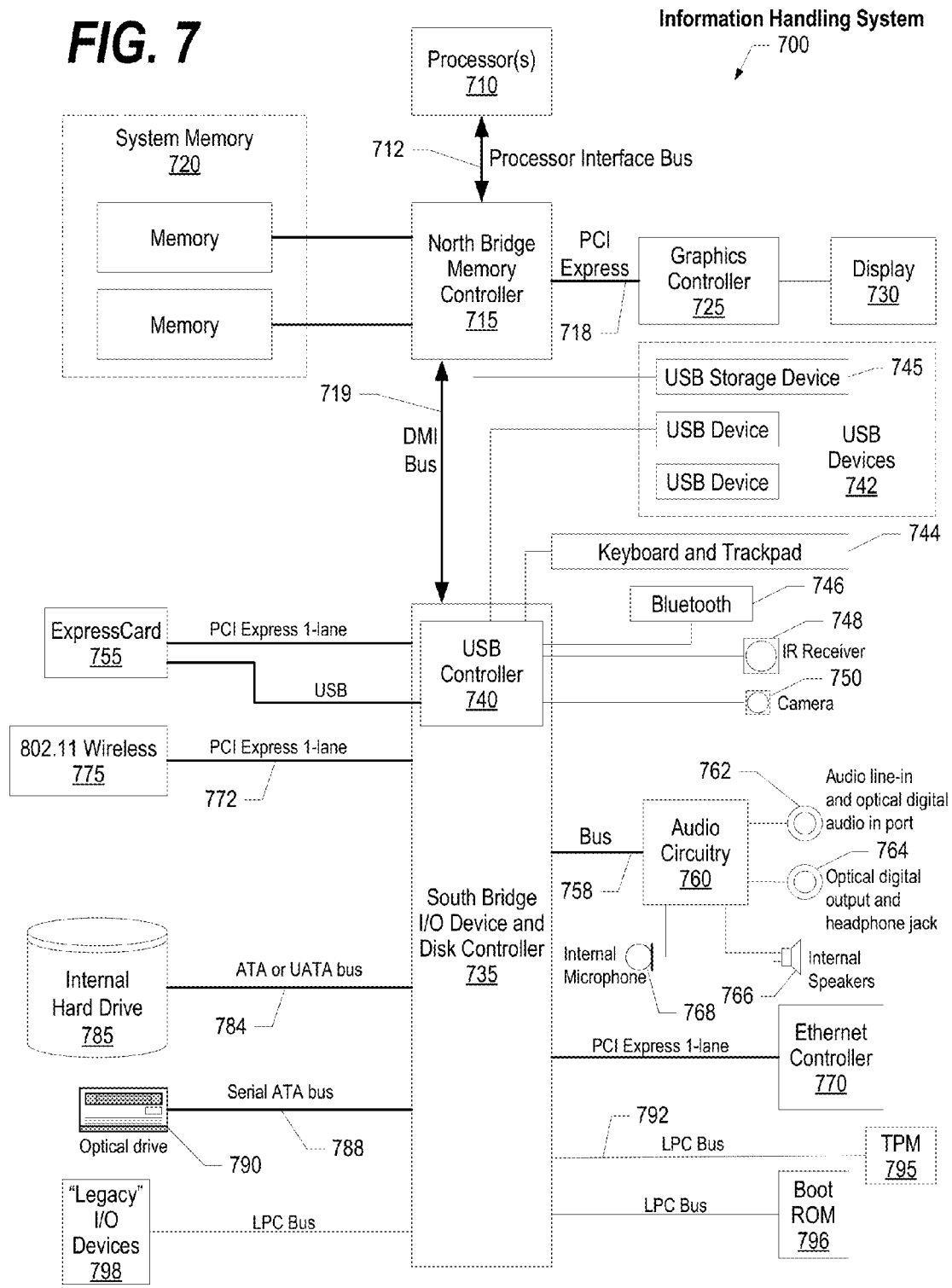
FIG. 7 is a block diagram of a data processing system in which the methods described herein can be implemented.

FIG. 7 illustrates information handling system 700, which is a simplified example of a computer system capable of performing the computing operations described herein. Information handling system 700 includes one or more processors 710 coupled to processor interface bus 712. Processor interface bus 712 connects processors 710 to Northbridge 715, which is also known as the Memory Controller Hub (MCH). Northbridge 715 connects to system memory 720 and provides a means for processor(s) 710 to access the system memory. Graphics controller 725 also connects to Northbridge 715. In one embodiment, PCI Express bus 718 connects Northbridge 715 to graphics controller 725. Graphics controller 725 connects to display device 730, such as a computer monitor.

Northbridge 715 and Southbridge 735 connect to each other using bus 719. In one embodiment, the bus is a Direct Media Interface (DMI) bus that transfers data at high speeds in each direction between Northbridge 715 and Southbridge 735. In another embodiment, a Peripheral Component Interconnect (PCI) bus connects the Northbridge and the Southbridge. Southbridge 735, also known as the I/O Controller Hub (ICH) is a chip that generally implements capabilities that operate at slower speeds than the capabilities provided by the Northbridge. Southbridge 735 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 796 and "legacy" I/O devices (using a "super I/O" chip). The "legacy" I/O devices (798) can include, for example, serial and parallel ports, keyboard, mouse, and/or a floppy disk controller. The LPC bus also connects Southbridge 735 to Trusted Platform Module (TPM) 795 via LPC bus 792. Other components often included in Southbridge 735 include a Direct Memory Access (DMA) controller, a Programmable Interrupt Controller (PIC), and a storage device controller, which connects Southbridge 735 to nonvolatile storage device 785, such as a hard disk drive, using bus 784.

ExpressCard® 755 is a slot that connects hot-pluggable devices to the information handling system. ExpressCard® 755 supports both PCI Express and USB connectivity as it connects to Southbridge 735 using both the Universal Serial Bus (USB) the PCI Express bus. Southbridge 735 includes USB Controller 740 that provides USB connectivity to devices that connect to the USB. These devices include webcam (camera) 750, infrared (IR) receiver 748, keyboard and trackpad 744, and Bluetooth device 746, which provides for wireless personal area networks (PANs). USB Controller 740 also provides USB connectivity to other miscellaneous USB connected devices 742, such as a mouse, removable nonvolatile storage device 745, modems, network cards, ISDN connectors, fax, printers, USB hubs, and many other types of USB connected devices. While removable nonvolatile storage device 745 is shown as a USB-connected device, removable nonvolatile storage device 745 could be connected using a different interface, such as a Firewire® interface, etcetera.

Wireless Local Area Network (LAN) device 775 connects to Southbridge 735 via the PCI or PCI Express bus 772. LAN device 775 typically implements one of the IEEE 802.11 standards of over-the-air modulation techniques that all use the same protocol to wireless communicate between information handling system 700 and another computer system or device. Optical storage device 790 connects to Southbridge 735 using Serial ATA (SATA) bus 788. Serial ATA adapters and devices communicate over a high-speed serial link. The Serial ATA bus also connects Southbridge 735 to other forms of storage devices, such as hard disk drives. Audio circuitry 760, such as a sound card, connects to Southbridge 735 via bus 758. Audio circuitry 760 also provides functionality such as audio line-in and optical digital audio in port 762, optical digital output and headphone jack 764, internal speakers 766, and internal microphone 768. Ethernet controller 770 connects to Southbridge 735 using a bus, such as the PCI or PCI Express bus. Ethernet controller 770 connects information handling system 700 to a computer network, such as a Local Area Network (LAN), the Internet, and other public and private computer networks.

While FIG. 7 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 795) shown in FIG. 7 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 8.

Figure 8:
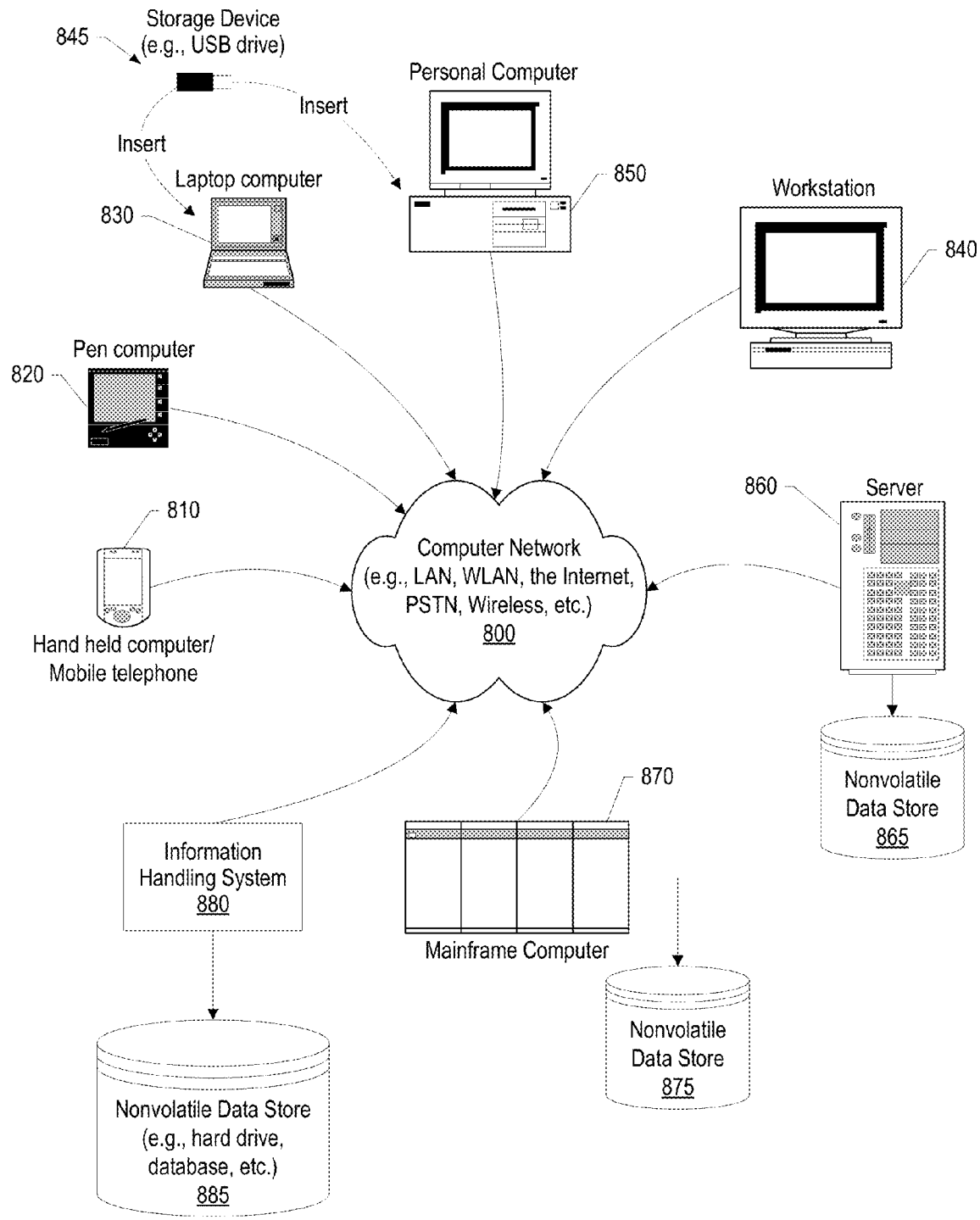
FIG. 8 provides an extension of the information handling system environment shown in FIG. 7 to illustrate that the methods described herein can be performed on a wide variety of information handling systems which operate in a networked environment.

FIG. 8 provides an extension of the information handling system environment shown in FIG. 7 to illustrate that the methods described herein can be performed on a wide variety of information handling systems that operate in a networked environment. Types of information handling systems range from small handheld devices, such as handheld computer/mobile telephone 810 to large mainframe systems, such as mainframe computer 870. Examples of handheld computer 810 include personal digital assistants (PDAs), personal entertainment devices, such as MP3 players, portable televisions, and compact disc players. Other examples of information handling systems include pen, or tablet, computer 820, laptop, or notebook, computer 830, workstation 840, personal computer system 850, and server 860. Other types of information handling systems that are not individually shown in FIG. 8 are represented by information handling system 880. As shown, the various information handling systems can be networked together using computer network 800. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 8 depicts separate nonvolatile data stores (server 860 utilizes nonvolatile data store 865, mainframe computer 870 utilizes nonvolatile data store 875, and information handling system 880 utilizes nonvolatile data store 885). The nonvolatile data store can be a component that is external to the various information handling systems or can be internal to one of the information handling systems. In addition, removable nonvolatile storage device 845 can be shared among two or more information handling systems using various techniques, such as connecting the removable nonvolatile storage device 845 to a USB port or other connector of the information handling systems.

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to disclosures containing only one such element, even when the same claim includes the introductory phrases "one or more" or "at least one" and indefinite articles such as "a" or "an"; the same holds true for the use in the claims of definite articles.

The invention claimed is:

1. An information handling system comprising:
   one or more processors;
   a memory coupled to at least one of the one or more processors;
   one or more non-volatile storage areas coupled to at least one of the one or more processors;
   a set of computer program instructions stored in the memory and executed by at least one of the processors in order to perform actions of:
      allocating a plurality of sample point identifiers to a root node included in an index tree corresponding to a database stored in one of the non-volatile storage areas, the index tree including a plurality of leaf nodes;
      identifying, by at least one of the one or more processors, a number of first nodes included in a plurality of first nodes that are child nodes of the root node;
      computing, by at least one of the one or more processors, a distribution average based upon the number of first nodes and a number of sample point identifiers included in the plurality of sample point identifiers;
      distributing the plurality of sample point identifiers to the plurality of first nodes, wherein an amount of the plurality of sample point identifiers distributed to each of the plurality of first nodes does not exceed the distribution average;
      recursively traversing through a plurality of hierarchical index levels included in the index tree and distributing the plurality of sample point identifiers from the plurality of first nodes to a subset of the plurality of leaf nodes;
      collecting sample data from the subset of the plurality of leaf nodes corresponding to the distributed plurality of sample point identifiers; and
      generating a query plan corresponding to the database based upon the collected sample data.

2. The information handling system of claim 1:
   the distribution is uniformly performed across the plurality of first nodes; and
   the subset of the plurality of leaf nodes is uniformly distributed across the plurality of leaf nodes included in the index tree.

3. The information handling system of claim 1 wherein one or more of the processors perform additional actions comprising:
   computing a collected sample standard deviation of the collected sample data;
   determining that the collected sample standard deviation reaches a standard deviation threshold;

in response to determining that the collected sample standard deviation fails to reach a standard deviation threshold, determining whether a maximum number of iterations is reached;

in response to determining that the maximum number of iterations has not been reached:

invoking a subsequent recursive traversal through the plurality of hierarchical index levels and uniformly distributing the plurality of sample point identifiers to a subsequent subset of the plurality of leaf nodes; and collecting subsequent sample data from the subsequent subset of the plurality of leaf nodes.

4. The information handling system of claim 3 wherein, in response to determining that the maximum number of iterations has been reached, one or more of the processors perform additional actions comprising:

generating a message that indicates the collected sample data fails to meet the standard deviation threshold.

5. The information handling system of claim 1 wherein one or more of the processors perform additional actions comprising:

generating a plurality of random numbers, wherein each of the plurality of random numbers identify one of the plurality of first nodes; and wherein the distribution of the plurality of sample point identifiers is based upon the plurality of random numbers and the computed distribution average.

6. The information handling system of claim 1 wherein one or more of the processors perform additional actions comprising:

selecting one of the plurality of first nodes;

determining the number of sample point identifiers that were distributed to the selected first node;

identifying a plurality of second nodes that are child nodes of the selected first node;

computing a subsequent distribution average based upon the number of second nodes and the number of sample point identifiers that were distributed to the selected first node; and re-distributing the sample point identifiers distributed to the selected first node to the plurality of second nodes based upon the computed subsequent distribution average.

7. The information handling system of claim 6 wherein one or more of the processors perform additional actions comprising:

determining that the plurality of second nodes are included in the plurality of leaf nodes; and assigning the re-distributed sample point identifiers to the plurality of second nodes.

8. The information handling system of claim 6 wherein one or more of the processors perform additional actions comprising:

determining that the plurality of second nodes fail to be included in the plurality of leaf nodes;

in response to determining that the plurality of second nodes fail to be included in the plurality of leaf nodes:

selecting one of the plurality of second nodes;

determining the number of sample point identifiers that were re-distributed to the selected second node;

identifying a plurality of third nodes that are child nodes of the selected second node;

computing a different distribution average based upon the number of third nodes and the number of sample point identifiers that were distributed to the selected second node; and re-distributing the sample point identifiers distributed to the selected second node to the plurality of third nodes based upon the computed different distribution average.

9. The information handling system of claim 1 wherein the distribution includes utilizing a plurality of memory arrays to store the plurality of sample point identifiers during the recursive traversal, and wherein each one of the plurality of memory arrays corresponds to one of the plurality of hierarchical index levels, each one of the plurality of memory arrays utilized for each index node included in their corresponding hierarchical index level during the recursive traversal.

10. A computer program product stored in a non-transitory computer readable storage medium, comprising computer program code that, when executed by an information handling system, causes the information handling system to perform actions comprising:

allocating a plurality of sample point identifiers to a root node included in an index tree of a database, the index tree including a plurality of leaf nodes;

identifying, by at least one of the one or more processors, a number of first nodes included in a plurality of first nodes that are child nodes of the root node;

computing, by at least one of the one or more processors, a distribution average based upon the number of first nodes and a number of sample point identifiers included in the plurality of sample point identifiers;

distributing the plurality of sample point identifiers to the plurality of first nodes, wherein an amount of the plurality of sample point identifiers distributed to each of the plurality of first nodes does not exceed the distribution average;

recursively traversing through a plurality of hierarchical index levels included in the index tree and distributing the plurality of sample point identifiers from the plurality of first nodes to a subset of the plurality of leaf nodes;

collecting sample data from the subset of the plurality of leaf nodes corresponding to the distributed plurality of sample point identifiers; and generating a query plan corresponding to the database based upon the collected sample data.

11. The computer program product of claim 10 wherein:

the distribution is uniformly performed across the plurality of first nodes; and the subset of the plurality of leaf nodes is uniformly distributed across the plurality of leaf nodes included in the index tree.

12. The computer program product of claim 10 wherein the information handling system performs:

computing a collected sample standard deviation of the collected sample data;

determining that the collected sample standard deviation reaches a standard deviation threshold;

in response to determining that the collected sample standard deviation fails to reach a standard deviation threshold, determining whether a maximum number of iterations is reached;

in response to determining that the maximum number of iterations has not been reached:

invoking a subsequent recursive traversal through the plurality of hierarchical index levels and uniformly distributing the plurality of sample point identifiers to a subsequent subset of the plurality of leaf nodes; and collecting subsequent sample data from the subsequent subset of the plurality of leaf nodes.

13. The computer program product of claim 10 wherein the information handling system performs:

generating a plurality of random numbers, wherein each of the plurality of random numbers identify one of the plurality of first nodes; and wherein the distribution of the plurality of sample point identifiers is based upon the plurality of random numbers and the computed distribution average.

14. The computer program product of claim 10 wherein the information handling system performs:

selecting one of the plurality of first nodes;

determining the number of sample point identifiers that were distributed to the selected first node;

identifying a plurality of second nodes that are child nodes of the selected first node;

computing a subsequent distribution average based upon the number of second nodes and the number of sample point identifiers that were distributed to the selected first node; and re-distributing the sample point identifiers distributed to the selected first node to the plurality of second nodes based upon the computed subsequent distribution average.

* * * * *